(12) United States Patent
Su et al.

(10) Patent No.: US 7,731,003 B2
(45) Date of Patent: Jun. 8, 2010

(54) AXIALLY ACTUATING DEVICE HAVING ELASTIC JOINING PORTION

(75) Inventors: Han-Wei Su, Hsinchu (TW); Wen-I Wu, Hsinchu (TW); Chao-Chang Hu, Hsinchu (TW); Yu-Han Chien, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 489 days.

(21) Appl. No.: 11/637,067

(22) Filed: Dec. 12, 2006

(65) Prior Publication Data

US 2007/0159010 A1 Jul. 12, 2007

(30) Foreign Application Priority Data

Dec. 23, 2005 (TW) .............................. 94146245 A

(51) Int. Cl.
*G02B 7/04* (2006.01)
(52) U.S. Cl. ....................................... 188/162; 359/824
(58) Field of Classification Search ......... 188/162–164; 340/384.1; 359/824; 369/44.15–44.22; 396/133; 348/345
See application file for complete search history.

(56) References Cited

U.S. PATENT DOCUMENTS

| 4,027,865 | A | * | 6/1977 | Greenwood et al. ......... 267/148 |
| 5,361,243 | A | * | 11/1994 | Kasahara .................. 369/44.15 |
| 5,673,152 | A | * | 9/1997 | Yokota et al. ................ 359/813 |
| 6,050,557 | A | * | 4/2000 | Shimoseki .................. 267/162 |
| 6,594,450 | B1 | | 7/2003 | Kao et al. |
| 6,800,970 | B2 | * | 10/2004 | Aoshima ................... 310/49 R |
| 2005/0180275 | A1 | * | 8/2005 | Shiraki et al. ............ 369/44.15 |
| 2006/0034599 | A1 | * | 2/2006 | Osaka ......................... 396/144 |
| 2007/0091199 | A1 | * | 4/2007 | Shiraki et al. ............... 348/345 |
| 2009/0086335 | A1 | * | 4/2009 | Tsuruta et al. .............. 359/693 |

FOREIGN PATENT DOCUMENTS

JP 2004-280031 10/2004

\* cited by examiner

*Primary Examiner*—Christopher P Schwartz
(74) *Attorney, Agent, or Firm*—Rabin & Berdo, P.C.

(57) ABSTRACT

An axially actuating device having an elastic joining portion is provided, which is used for carrying an object and actuating the object to move axially, and comprises a fixed portion, a moving portion, and a joining member. The joining member is used to combine the fixed portion with the moving portion, such that the fixed portion and the moving portion are axially coupled with each other. Moreover, the fixed portion and the moving portion are respectively a fixed magnet and a coil, such that when a current is applied to the moving portion, the moving portion generates a relative displacement with respect to the fixed portion according to the current, so as to provide an axial displacement. Meanwhile, the moving energy is generated due to the repulsive interaction of the magnetic field, and thus a shock proofing efficacy is also provided.

30 Claims, 5 Drawing Sheets

AXIALLY ACTUATING DEVICE HAVING ELASTIC JOINING PORTION

CROSS-REFERENCE TO RELATED APPLICATIONS

This non-provisional application claims priority under 35 U.S.C. §119(a) on Patent Application No(s). 094146245 filed in Taiwan, R.O.C. on Dec. 23, 2005, the entire contents of which are hereby incorporated by reference.

BACKGROUND OF THE INVENTION

1. Field of Invention

The present invention relates to an axially actuating device having an elastic joining portion, and more particularly, to an axially actuating device applied in a digital image-capturing device.

2. Related Art

Generally, driving devices that are convenient for carrying along and available for be used at any time have the characteristics of being small, light, and chic, and on the other aspect, it is easily dropped off due to incautiousness, which thus damages the inside mechanism or the function is not desirable. Therefore, the dependence on a protecting device is essentially increased, but the addition of the protecting device results in increasing of the number of parts, and thus increasing the volume and weight and becoming inconvenient for reserving, so that the original advantages are not existed any longer. Moreover, from the designing view of being light, thin, short, and small, the decrease in size enhances the difficulty in assembling, so that the cost is increased.

The motor is widely used as a portable electronic device, and the growing speed of the number of motors applied in the current portable electronic equipments such as a digital camera has continuously exceeded that of voice coil motors and spindle motors applied in a hard disk driver conventionally. Nowadays, the development of the motor must satisfy the strict miniaturization trend requirements. The conventional voice coil motors have substantially the same structure, which generally consist of components such as a coil, a magnet, and a yoke. The largest difference between structures of conventional voice coil motors lies in the joining component for combining the moving portion with the fixed portion, since a complete actuator can be assembled only through the joining component.

The joining device generally includes the following types, which all have disadvantages as follows. 1. Spring-type joining device is performed in the way of pressing the brush by a spring. The axial length is too long to satisfy the miniaturization requirement, and since the mechanical spring has a large coefficient of rigidity, a large elastic force should be overcome. 2. Linear bearing-type joining device, contrary to the spring-type joining device, occupies an extreme large space in the radial direction, and a positioning device is required to control the displacement. 3. Leaf spring-type joining device, a commonly used joining component in the market, occupies a small space, and thus satisfying the miniaturization requirement. However, the most significant disadvantage of the leaf spring-type joining device lies in that, a small amount of rotating movement is made in the axial direction, and the shock proofing efficacy is not provided, and thus not suitable for a product that is liable to be dropped out.

SUMMARY OF THE INVENTION

The basic architecture of the present invention is a driving device assembled by a coil, a permanent magnet, a yoke, and an elastic non-metallic composite material. According to Lorentz theorem, the operating principle is that, the conductive coil is affected by a magnetic field to produce an acting force (F=I×B, wherein F represents acting force, I represents current, and B represents magnetic flux density). The acting force is used to force the object to move towards the axial direction, and the elastic non-metallic composite material not only joins the moving portion (coil) to the fixed portion (magnet), but also achieves the shock absorbing and dropping resistant effects. Moreover, a molding technique is used to form the elastic non-metallic composite material and to join the moving portion (coil) to the fixed portion (magnet), so as to greatly reduce the manufacturing cost and eliminate the assembling problems.

In order to achieve the above efficacy, the present invention provides an axially actuating device having an elastic joining portion, which is used for carrying an object and actuating the object, and comprises a fixed portion, which is a permanent magnet; a moving portion, which is a coil group movably disposed within the fixed portion; and a joining member, which comprises a supporting member, for combining with the fixed portion; an actuating member, for combining with the moving portion; and a plurality of joining members, for extendably joining the supporting member to the actuating member.

The present invention also provides a joining portion structure, which is used in an axially actuating device having a fixed portion and a moving portion, and comprises: a supporting member, for combining with the fixed portion; an actuating member, for combining with the moving portion; and a plurality of joining members, for extendably joining the supporting member to the actuating member. The supporting member is a hollow frame. The actuating member is a plate-shaped object. The joining structure is made of a non-metallic composite material having an appropriate flexibility and rigidity. The joining members are symmetrically disposed.

The present invention further provides an axially actuating device having an elastic joining portion, which is used for carrying an object and actuating the object, and comprises: a fixed portion, which is a permanent magnet; a moving portion, which is a coil group movably disposed within the fixed portion; and a joining member, which comprises an actuating member for combining with the moving portion, and a plurality of joining members with one end being extendably joining to the fixed portion and with the other end being joining to the actuating member.

By implementing the present invention, at least the following progressive efficacies can be achieved.

First, it is ensured that the carried object moves axially without any deflection.

Second, the joining portion is used to join the fixed portion (magnet) to the moving portion (coil).

Third, the joining portion has an efficacy of limiting the displacement of the moving portion.

Fourth, the joining portion protects the axially actuating device, and thus the shock absorbing and dropping resistant efficacies can be achieved when the device is applied in a driving device of a miniature voice coil motor, such as a cell phone camera, so as to protect the whole device from being damaged and from being affected in the function.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
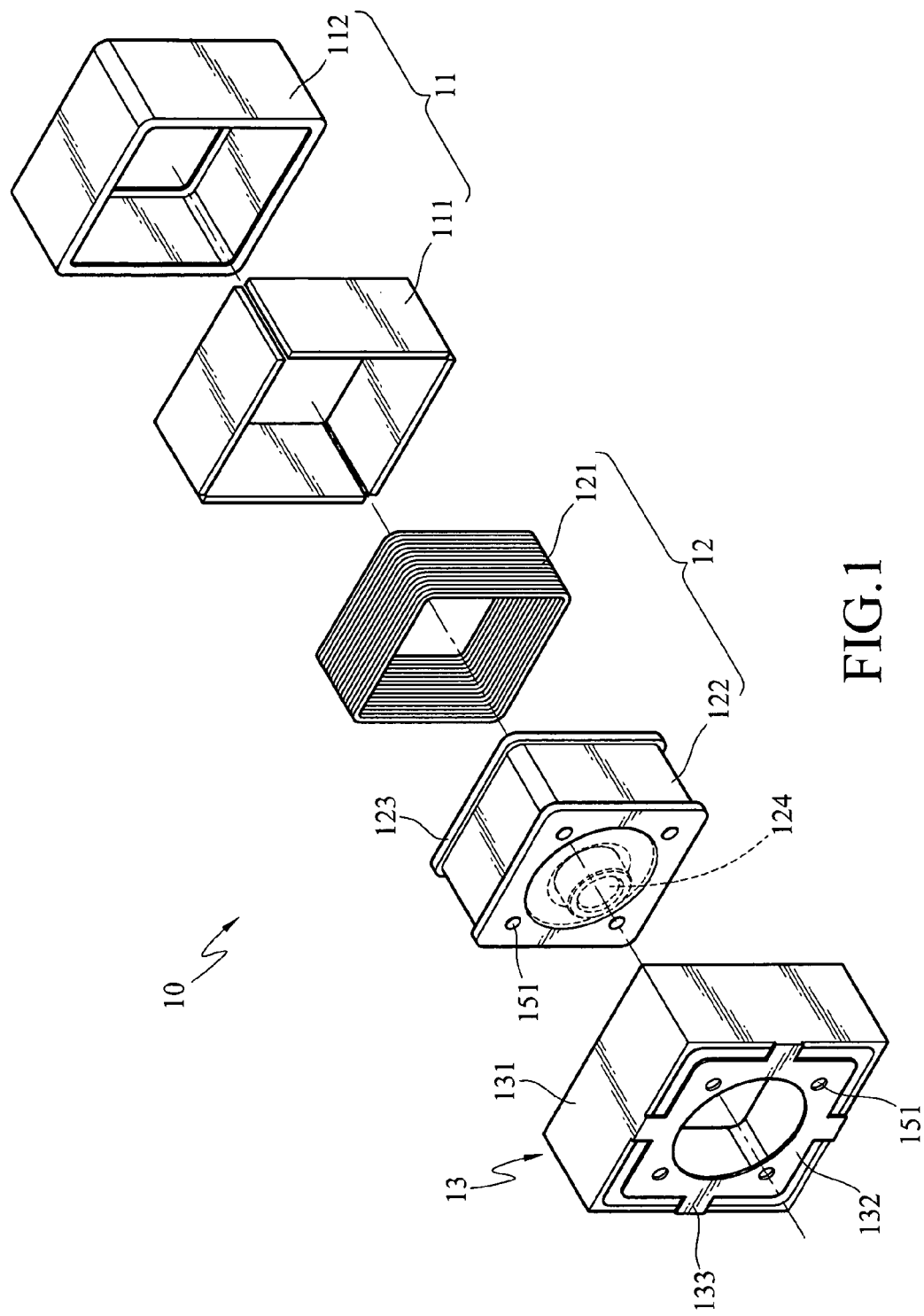
FIG. 1 is an exploded stereogram of an embodiment of an axially actuating device having an elastic joining portion of the present invention.
Figure 2:
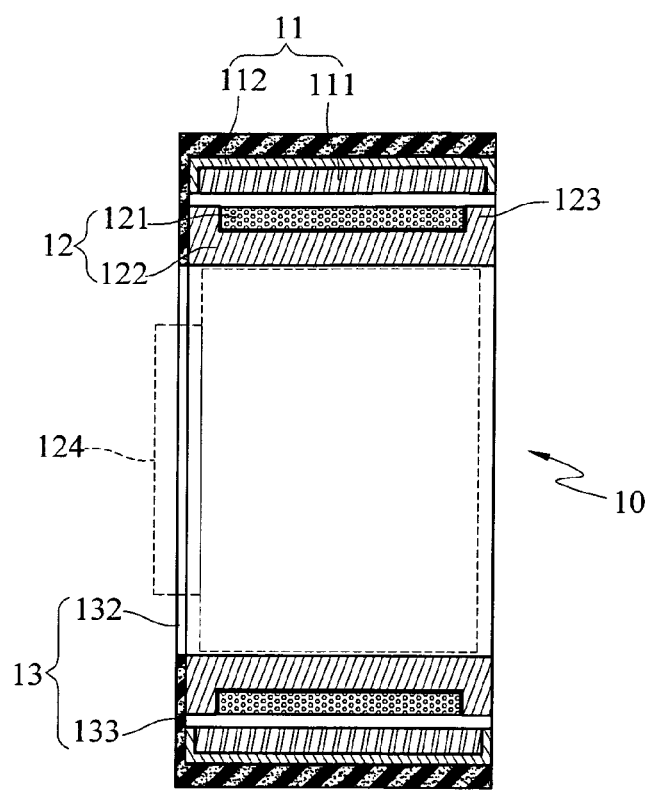
FIG. 2 is an assembled cross-sectional view of an embodiment of the axially actuating device having an elastic joining portion of the present invention.
Figure 3:
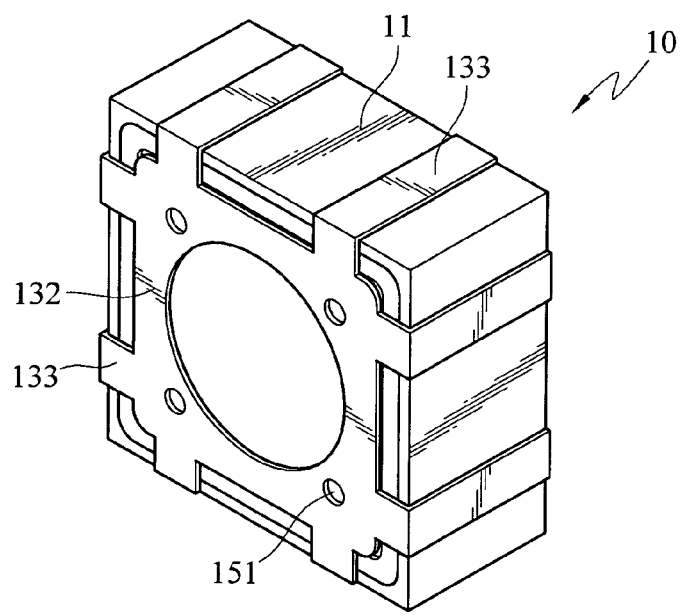
FIG. 3 is a stereogram of an embodiment of the axially actuating device having an elastic joining portion of the present invention after a supporting member is omitted.
Figure 4:
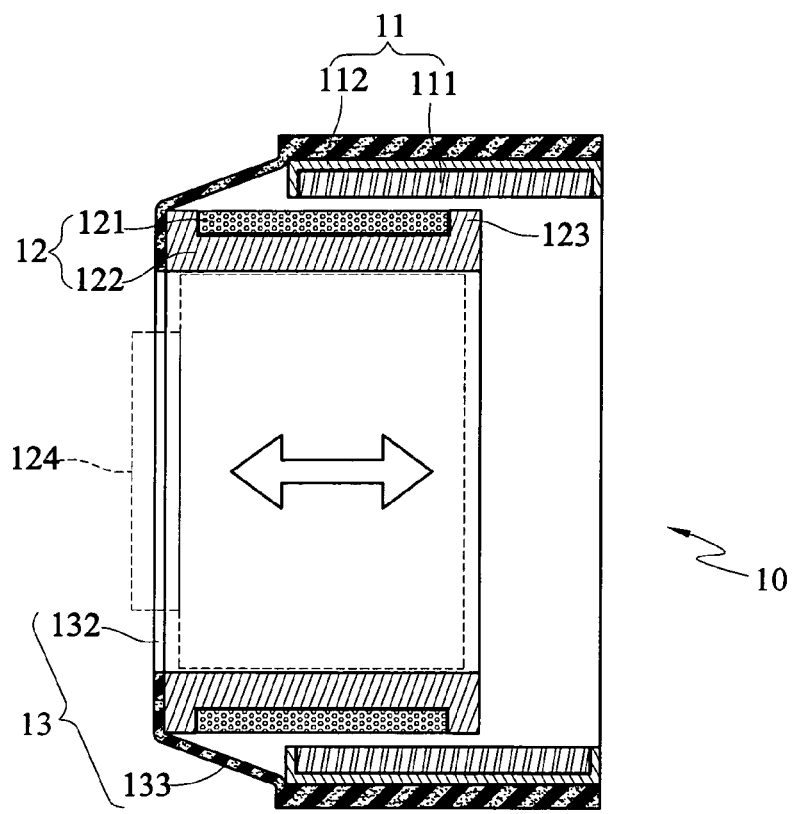
FIG. 4 is a cross-sectional view of an embodiment of the axially actuating device having an elastic joining portion of the present invention when the moving portion is under an extending state.
Figure 5:
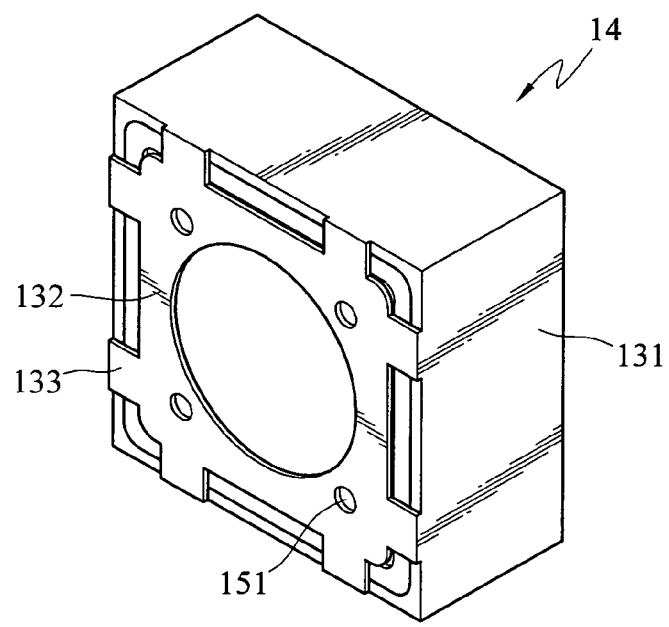
FIG. 5 shows another implementation aspect of a joining portion of the axially actuating device having an elastic joining portion of the present invention.
Figure 6:
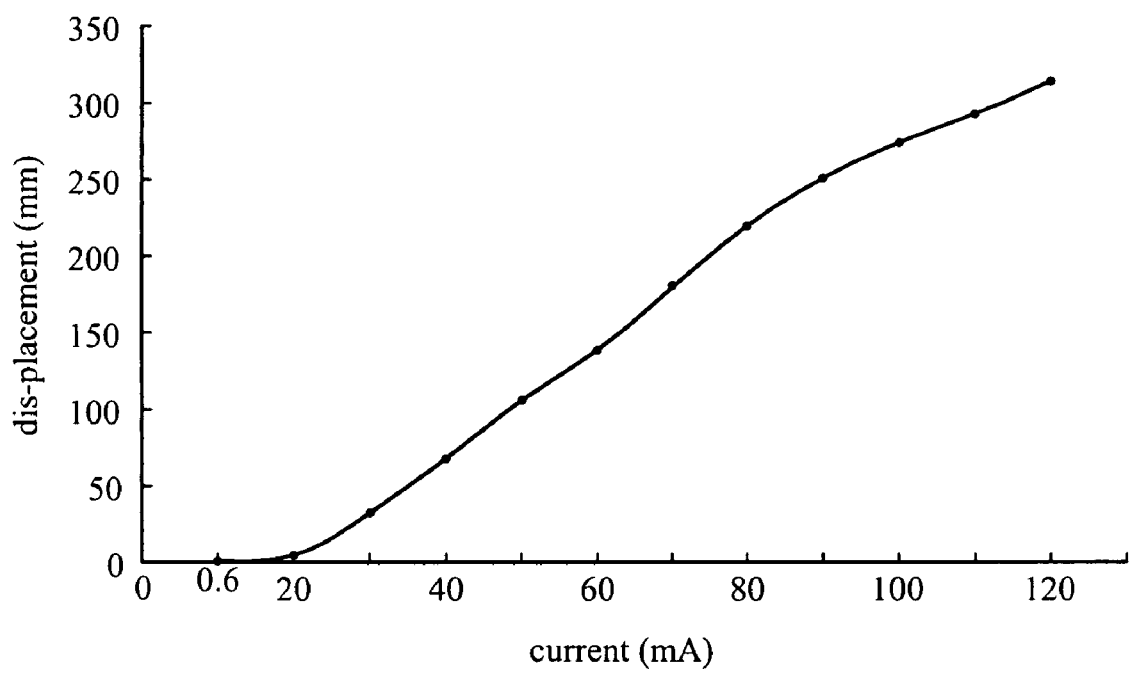
FIG. 6 is a relation curve of current and displacement of the axially actuating device having an elastic joining portion of the present invention.
Figure 7:
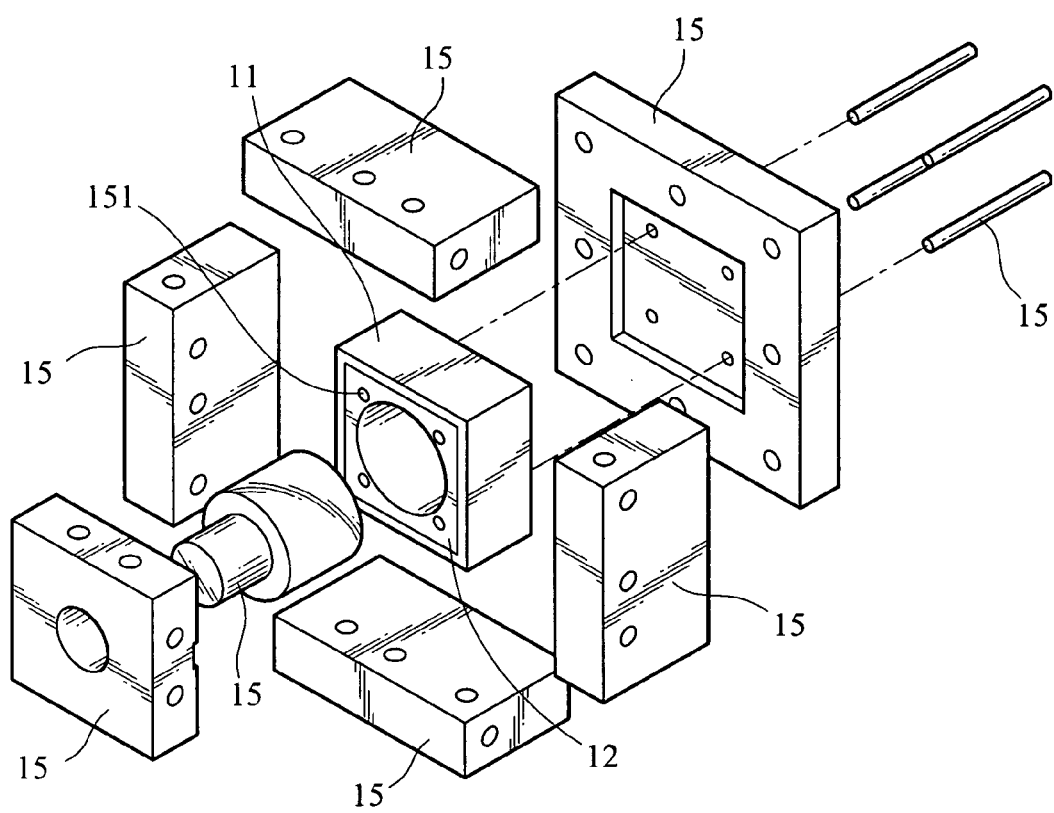
FIG. 7 is a schematic exploded view of a mold for mold filling process of the joining portion of the axially actuating device having an elastic joining portion of the present invention.

FIG. 1 is an exploded stereogram of an embodiment of an axially actuating device 10 having an elastic joining portion of the present invention. FIG. 2 is an assembled cross-sectional view of an embodiment of the axially actuating device 10 having an elastic joining portion of the present invention. FIG. 3 is a stereogram of an embodiment of the axially actuating device having an elastic joining portion of the present invention after a supporting member is omitted. FIG. 4 is a cross-sectional view of an embodiment of the axially actuating device 10 having an elastic joining portion of the present invention when the moving portion 12 is under an extending state. FIG. 5 shows another implementing aspect of a joining portion 14 of the axially actuating device having an elastic joining portion of the present invention. FIG. 6 is a relation curve of electric current and axial displacement of the axially actuating device 10 having an elastic joining portion of the present invention. FIG. 7 is a schematic exploded view of a mold for a mold filling process of the joining portion 13 of the axially actuating device 10 having an elastic joining portion of the present invention.

This embodiment provides an axially actuating device 10 having a small size and a light weight, and particularly, a driving device for a miniature voice coil motor. The axially actuating device 10 can carry a suitable object therein, for example, a fixed-focal lens 124 module. The function of changing positions (for example, auto-focusing requires a displacement of lens module) is achieved by the axially actuating device 10 of this embodiment.

FIGS. 1 and 2 are respectively an exploded stereogram of an embodiment of an axially actuating device having an elastic joining portion 13 of the present invention and an assembled cross-sectional view of an embodiment of the axially actuating device having an elastic joining portion 13 of the present invention. The axially actuating device having an elastic joining portion 13 of this embodiment is used for carrying an object and actuating the object, and includes a fixed portion 11, a moving portion 12, and the joining portion 13.

The fixed portion 11 is mainly formed by a permanent magnet 111 made of a material with a high remanent magnetic flux density. In order to protect and enable the permanent magnet 111 to have a stronger structural capability and improve the efficiency of magnetic circuit, the fixed portion 11 further includes a first support 112. The first support 112 is a hollow frame with a structure supporting function, and the permanent magnet 111 is disposed on an inner side of the first support 112.

The moving portion 12 has a coil group 121 with the same principle as that of the coil used in a common motor. Likewise, in order to enable the coil group 121 to have a more preferred structural behavior, the moving portion 12 further includes a second support 122, and the coil group 121 is wound on the second support 122. The second support 122 is a housing with a central round hole, and made of a common plastic or metal material, and the second support 122, i.e., the housing, has a wing plate 123 extending from each external end, thereby fixing the coil more stably. Moreover, the second support 122 further carries a lens 124.

The joining portion 13 includes a supporting member 131, an actuating member 132, and a plurality of joining members 133.

The supporting member 131 is a hollow frame for combining with the fixed portion 11. The actuating member 132 is a plate-shaped object for combining with the moving portion 12. The plurality of joining members 133 are disposed between the supporting member 131 and the actuating member 132 for joining the supporting member 131 to the actuating member 132.

FIG. 3 is a stereogram of an embodiment of the axially actuating device having an elastic joining portion of the present invention after a supporting member is omitted. Although the supporting member 131 of the above joining portion 13 can enhance the structural behavior of the joining portion 13 at the fixed portion 11, considering the volume and weight, the supporting member 131 is omitted, and the plurality of joining members 133 are directly combined with the fixed portion 11 instead of originally combining with one end of the supporting member 131.

FIG. 4 is a cross-sectional view of an embodiment of the axially actuating device having an elastic joining portion 13 of the present invention when the moving portion 12 is under an extending state. The joining portion 13 is made of a flexible, non-metallic composite material having a large deformability or an appropriate flexibility and rigidity, and particularly, made of silica gel.

The joining members 133 are used for extendably joining the supporting member 131 to the actuating member 132. Therefore, when the moving portion 12 extends due to the electromagnetic effect, the joining member 133 is forced to extend through the actuating member 132 under the force exerted by the moving portion 12. When the force exerted by the moving portion 12 is eliminated or reduced, the joining member 133 recovers to the original shape, thus achieving a restoration efficacy.

FIG. 5 shows another implementing aspect of a joining portion 14 of the axially actuating device having an elastic joining portion 10 of the present invention. In order to make the force behavior between the actuating member 132 and the moving portion 12 be much smoother, the joining members 133 are symmetrically disposed, and particularly, it not only can be disposed in a way of four joining members 133, but also in a way of eight joining members 133, or in other ways. As an increasing number of the joining members 133 are disposed, the rigidity of the actuating member 132 becomes higher, and thereby further limiting and affecting the function of the moving portion 12.

FIG. 6 is a relation curve of current and displacement of the axially actuating device having an elastic joining portion 10 of the present invention. In order to prove that this embodiment does achieve a practical and progressive efficacy, an axially actuating device 10 with eight joining members 133 is used for a test. It can be known from the figure that, when the current in the horizontal axis increases, the distance in the longitudinal axis also increases in an approximately linear way. Therefore, it is proved that the axially actuating device 10 of this embodiment has a preferred functional efficacy.

FIG. 7 is a schematic exploded view of a mold for a mold filling process of the joining portion of the axially actuating device having an elastic joining portion 10 of the present invention. The joining portion 13 of the axially actuating device 10 is further molded after the fixed portion 11 and the moving portion 12 have been assembled. Being fabricated by using the mold 15, the volume of the joining portion 13 is reduced, and the whole joining portion 13 is coated outside the fixed portion 11, so as to achieve the protection effects of shock proofing and dropping resistance. When the mold 15 is used for fabrication, a design of a mold hole 151 for aligning is disposed on the actuating member 132 and the second support 122, and also has an efficacy of reducing the weight or increasing the structural strength. The elastic non-metallic composite material used for fabricating the joining portion 13 is silica gel, which has characteristics of elastically deforming, shock proofing, and dropping resistance. The material is thick before being solidified, and can be molded into an expected shape, which thus has an advantage of being easily processed. The hardness of an ordinary silica gel is directly adjusted by adjusting the proportion of the diluter. The fabrication process is very simple, and the device is formed simply through appropriately stirring, vacuumizing, mold filling, vacuumizing, baking, and cooling. The dropping resistant efficacy and the assembling efficiency of the driving device can be achieved through using the silica gel, without adding components.

In order to increase the interaction force of the magnetic field between the moving portion 12 and the permanent magnet 111, the above joining portion 13 is also made of a non-metallic composite material doped with a magnetic powder, and the doped magnetic powder is preferably the nanometer-scale specification. When the joining portion 13 is made of a non-metallic composite material doped with a magnetic powder, and when the joining portion 13 is combined with the permanent magnet 111, the magnetic force lines of the permanent magnet 11 are conducted with the magnetic powder in the joining portion 13, and thus the magnetic field of the permanent magnet 111 extends, so that the interactive force of the magnetic field between the moving portion 12 and the permanent magnet 111 is enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An axially actuating device having an elastic joining portion, for carrying an object and actuating the object, comprising:
   a fixed portion, being a permanent magnet;
   a moving portion, being a coil group, movably disposed in the fixed portion; and
   a joining portion, comprising:
      a supporting member attached with the fixed portion;
      an actuating member attached with the moving portion; and
      a plurality of joining members, each of the joining members having a first end directly fastened to the supporting member and having a second end directly fastened to the actuating member, each joining member being comprised of an elastic, flexible, non-metallic composite material.

2. The axially actuating device as claimed in claim 1, which is an axially actuating device for a miniature voice coil motor.

3. The axially actuating device as claimed in claim 1, wherein the permanent magnet is comprised of a material with a magnetic flux density.

4. The axially actuating device as claimed in claim 1, wherein the fixed portion further comprises a first support, and the permanent magnet is disposed on an inner side of the first support.

5. The axially actuating device as claimed in claim 1, wherein the moving portion further comprises a second support, and the coil group is wound on the second support.

6. The axially actuating device as claimed in claim 5, wherein the second support is a housing having a central round hole defined therein, and having a wing plate extending from each external end.

7. The axially actuating device as claimed in claim 5, wherein the second support further carries a lens.

8. The axially actuating device as claimed in claim 5, wherein the second support is comprised of a plastic material.

9. The axially actuating device as claimed in claim 5, wherein the second support is comprised of a metal material.

10. The axially actuating device as claimed in claim 1, wherein the joining portion is comprised of a silica gel material.

11. The axially actuating device as claimed in claim 1, wherein the joining members are symmetrically disposed.

12. The axially actuating device as claimed in claim 1, wherein the joining portion is comprised of the elastic, flexible, non-metallic composite material doped with a magnetic powder.

13. A joining portion structure, used in an axially actuating device having a fixed portion and a moving portion, comprising:
   a supporting member attachable with the fixed portion;
   an actuating member attachable with the moving portion; and
   a plurality of joining members, each joining members having a first end directly fastened to the supporting member and having a second end directly fastened to the actuating member, each joining member being comprised of an elastic, flexible, non-metallic composite material.

14. The joining portion structure as claimed in claim 13, wherein the supporting member is a hollow frame.

15. The joining portion structure as claimed in claim 13, wherein the actuating member is a plate-shaped object.

16. The joining portion structure as claimed in claim 13, wherein the joining portion structure is comprised of a silica gel material.

17. The joining portion structure as claimed in claim 13, wherein the joining members are symmetrically disposed.

18. The joining portion structure as claimed in claim 13, wherein the joining portion structure is comprised of the elastic, flexible, non-metallic composite material doped with a magnetic powder.

19. The axially actuating device as claimed in claim 13, wherein the joining portion structure is comprised of the elastic, flexible, non-metallic composite material doped with a magnetic powder.

20. An axially actuating device having an elastic joining portion, for carrying an object and actuating the object, comprising:
    a fixed portion, being a permanent magnet;
    a moving portion, being a coil group, movably disposed within the fixed portion; and
    a joining portion, comprising:
        an actuating member attached with the moving portion; and
        a plurality of joining members, each of the joining members having a first end directly fastened to the fixed portion, and having a second end directly fastened to the actuating member, each joining member comprising an elastic, flexible, non-metallic composite material.

21. The axially actuating device as claimed in claim 20, wherein the moving portion further comprises a second support, and the coil group is wound on the second support.

22. The axially actuating device as claimed in claim 21, wherein the second support is a housing having a central round hole defined therein, and having a wing plate extended from each external end.

23. The axially actuating device as claimed in claim 21, wherein the second support further carries a lens.

24. The axially actuating device as claimed in claim 21, wherein the second support is comprised of a plastic material.

25. The axially actuating device as claimed in claim 21, wherein the second support is comprised of a metal material.

26. The axially actuating device as claimed in claim 20, wherein the axially actuating device is an axially actuating device for a miniature voice coil motor.

27. The axially actuating device as claimed in claim 20, wherein the permanent magnet is comprised of a material with a remanent magnetic flux density.

28. The axially actuating device as claimed in claim 20, wherein the fixed portion further comprises a first support, and the permanent magnet is disposed on an inner side of the first support.

29. The axially actuating device as claimed in claim 20, wherein the joining portion is comprised of a silica gel material.

30. The axially actuating device as claimed in claim 20, wherein the joining members are symmetrically disposed.

* * * * *